May 31, 1960     A. V. HINTON     2,938,495
BIRD BATH
Filed Aug. 7, 1957
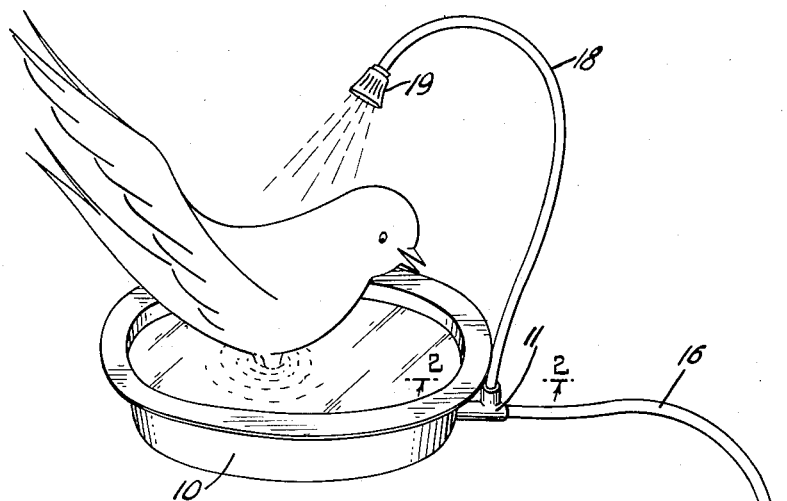
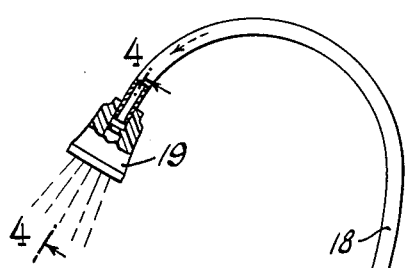
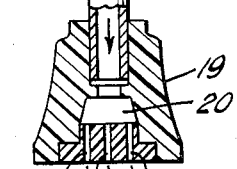
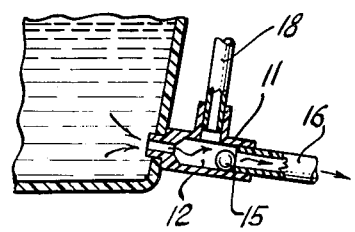
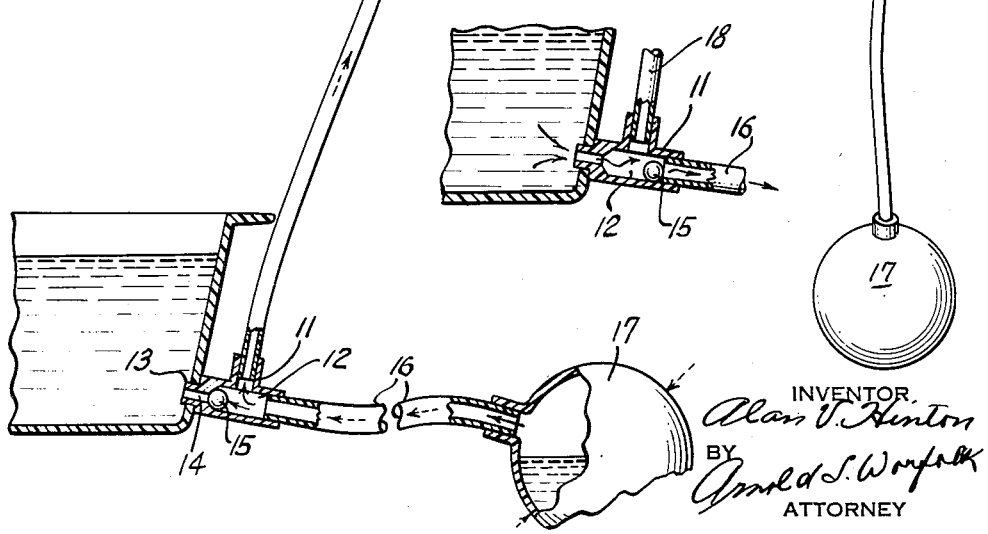

United States Patent Office 2,938,495
Patented May 31, 1960

2,938,495
BIRD BATH
Alan V. Hinton, 67 Murray St., Brooklyn, N.Y.
Filed Aug. 7, 1957, Ser. No. 676,769
1 Claim. (Cl. 119—1)

This invention relates to bird baths and more particularly to one equipped with a manually operated shower.

Birds are interesting pets. Their antics are enjoyable to watch, especially their antics in taking a bath. The shower bath with which this invention is concerned provides an attraction for the bird and a means for creating conditions which stimulate the performance of such antics.

Essentially the bird shower bath comprises a water container simulating a bathtub large enough to hold an amount of water sufficient to attract the bird and in which the bird can stand. At one end of the tub there is mounted a shower fixture equipped with an overhead nozzle designed to eject a spray downwardly on the head of a bird standing in the tub. The shower fixture further includes devices and connections, manually operated, for drawing water from the tub and circulating it to the nozzle under pressure conditions that create the spray.

A better understanding of the invention may be had by referring to the accompanying drawing wherein:

Fig. 1 is a perspective view of a bird bath equipped with the present improvements;

Fig. 2 is a view of the bird bath on a larger scale than shown in Fig. 1, partially in elevation and partially in vertical section, the partial vertical section being on line 2—2 of Fig. 1;

Fig. 3 is a vertical sectional view of the recirculating connections shown in Fig. 2, and on the same scale but with the parts shown in a different position; and, Fig. 4 is a vertical sectional view on line 4—4 of Fig. 2, but on a somewhat enlarged scale.

The bird bath, except as hereinafter specifically pointed out, may be all of molded or extruded plastic material and comprises, in part, a container or tub 10 which may be elliptical in shape to simulate a small bathtub. An inverted, generally T-shaped fixture 11, molded with a relatively large chamber 12 in its horizontal body portion, is formed at one end with a reduced section 13 which fits into a hole in the sidewall of the tub near its bottom. The chamber 12 is connected with the interior of the tub through a duct 14 which passes through the reduced section 13 of the fixture and which itself is reduced in cross-section as compared with the cross-section of the chamber 12. The end of chamber 12 is beveled where it meets duct 14 to provide a seat which accommodates a ball 15 of smaller diameter than the chamber but of larger diameter than the duct.

The device just described serves as a check valve acting, when ball 15 rests on its beveled seat, to cut off communication between the tub and the chamber and, when the ball moves away from its seat, to establish communication between the tub and the chamber (compare Figs. 2 and 3).

The chamber 12, at the end opposite the ball seat, through a flexible hose 16 having an air tight fitting with chamber 12, is connected with a hollow flexible rubber bulb 17 whose interior constitutes a water reservoir. The end of flexible hose 16, which is inside chamber 12 serves to limit movement of ball 15 when it moves away from its seat. Chamber 12 is also connected at the top, through a rigid tube 18, with a shower nozzle 19. Tube 18 has an air tight connection with fitting 11 and is supported in an upright position thereby. Tube 18 extends upwardly and then downwardly in gooseneck configuration and terminates in nozzle 19 at about the center of the tub. Nozzle 19 has an enlarged recess 20 in the body part thereof which is closed by face plate 21. Face plate 21 is equipped with a plurality of small holes 22 connecting recess 20 with the atmosphere and through which water is ejected in spray form when forced to the nozzle under pressure.

In use, water is poured in the tub to a level substantially above the level of duct 14 leading to chamber 12 which in turn leads to the water reservoir in rubber bulb 17. Rubber bulb 17 is squeezed and then released. As it tends to restore itself to normal spherical shape, in the fashion of a bulb type syringe, a partial vacuum therein is created. The air pressure at the base of gooseneck tube 18, i.e., in the chamber 12, is approximately atmospheric but the pressure at the connection 14 with tub 10 is equivalent to the head of water in the tub. Accordingly, ball 15 unseats itself (Fig. 3), permitting water to pass through chamber 12 and into rubber bulb 17. Now, when the bulb is squeezed, water passes back through tube 16. It closes the check valve as by seating ball 15 and thereby prevents water from passing back into the tub. Instead, water passes up tube 18 to nozzle head 19 from which it is ejected under pressure in the form of a spray. A bird standing beneath the spray will be showered (Fig. 1). To the extent that water is not thrown out of the tub by the shaking or preening of the bird, but is returned to the tub through the shower nozzle, the shower is capable of being operated time after time as long as desired.

The invention has been described in connection with one embodiment only but many modifications thereof are included within its spirit. It is to be limited, therefore, only by the scope of the appended claim.

What is claimed is:

A bird bath comprising an open-top water container, a first closed conduit operatively connected to a lower portion of said container, and a flexible bulb-like member operatively connected to said first closed conduit, a one-way valve in said first closed conduit adjacent said container, and a second closed conduit having one end thereof operatively connected to said first closed conduit between said valve and said bulb-like member and having a spray nozzle on the other end thereof, said nozzle being adapted to overlie said container whereby when said bulb-like member is operated a bird in said container will be given a shower.

References Cited in the file of this patent
UNITED STATES PATENTS

| Re. 8,238 | Mattson | May 21, 1878 |
| 159,872 | Wenzel | Feb. 16, 1875 |
| 191,557 | Zinn | June 5, 1877 |
| 1,354,113 | Leverett | Sept. 28, 1920 |
| 2,342,940 | Janke | Feb. 29, 1944 |

FOREIGN PATENTS

| 375,503 | Great Britain | June 30, 1932 |

OTHER REFERENCES

"Science Illustrated," February 1948, page 79.